Patented Jan. 22, 1924.

1,481,317

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF NEW YORK.

SPEED-CONTROL SYSTEM FOR INDUCTION MOTORS.

Application filed August 26, 1918. Serial No. 251,381.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Speed-Control Systems for Induction Motors, of which the following is a specification, this being a continuation in part of application Serial No. 69,189, filed Dec. 29, 1915.

My invention relates to systems of speed control for induction motors, and it has for its object to provide a system of the character designated that shall operate to give a wide and readily adjustable range of speed regulation with small energy losses and with the use of auxiliary apparatus of reasonable size and weight.

Figure 1:
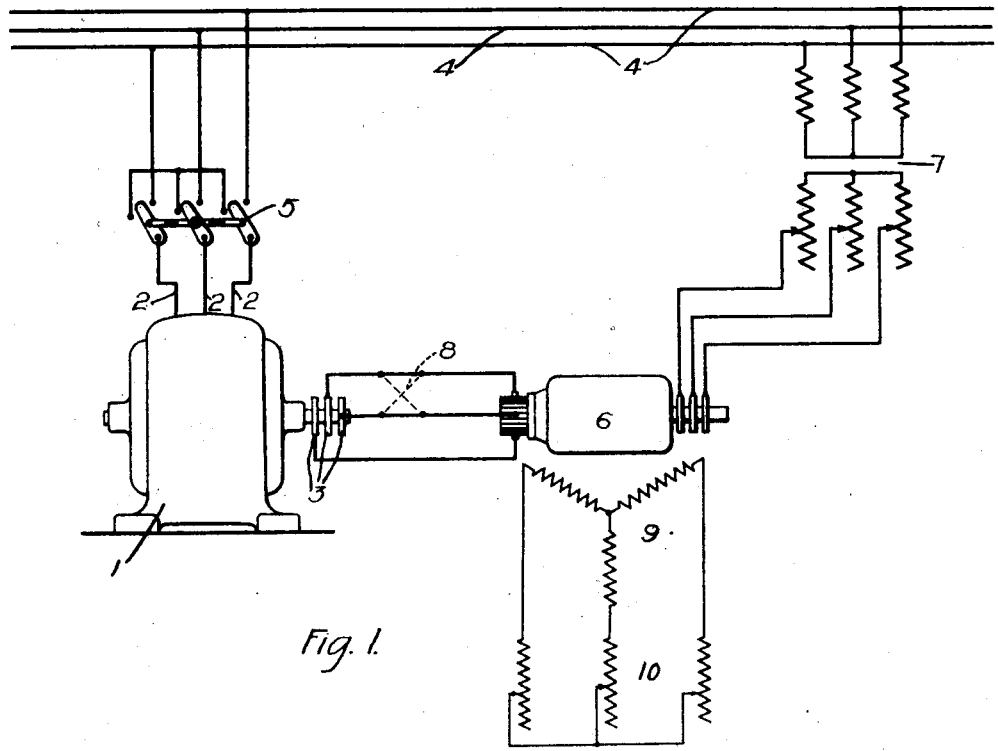
Figure 2:
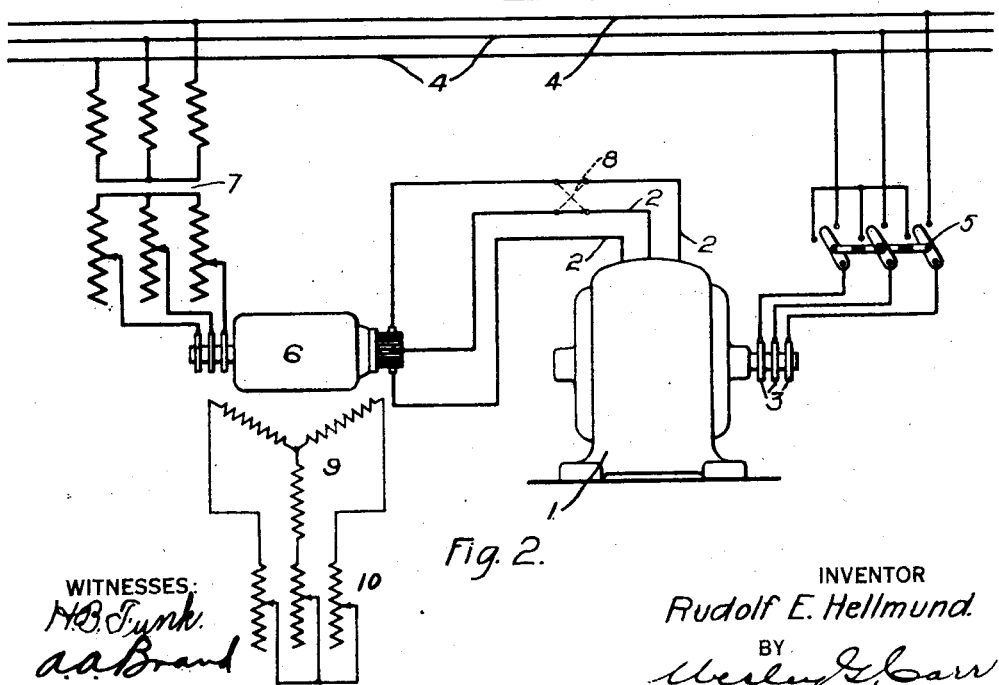

For a better understanding of my invention reference may be had to the accompanying drawing in which Fig. 1 is a diagrammatic view of an induction motor together with its attendant supply and control circuits embodying a preferred form of my invention; while Fig. 2 illustrates a modification of the system shown in Fig. 1.

The usual method of controlling the speed of an induction motor is to connect a resistance in the secondary circuit thereof, whereby the voltage developed within the secondary winding, and, consequently, the slip may be adjusted. This system is extremely wasteful, operation at half synchronous speed involving a loss in the control resistance of substantially one-half the energy supplied to the motor. Furthermore, operation at over-synchronous speeds is not possible.

A marked improvement over the above method of control has been proposed wherein a frequency changer and a voltage-adjusting transformer are connected between the secondary terminals of an induction motor and the source. In a system of this character, during under-synchronous operation, energy derived from the secondary winding is altered to line frequency in the frequency converter and is then suitably modified in voltage by the transformer for return to the source. In like manner, for over-synchronous operation, energy derived from the source is suitably altered in voltage by the transformer and in frequency by the frequency changer for supply to the secondary member of the motor.

A marked disadvantage of the last mentioned system resides in the fact that the capacity of the frequency changer employed must bear approximately the same proportion of the capacity of motor as the percent speed ratio involved. That is to say, if regulation of the induction motor down to 50% of synchronous speed is desired, the frequency changer must be designed for one-half the capacity of the motor and if speed regulation down to zero is desired, the frequency changer must have substantially the same capacity as the motor.

By my invention, I employ the elements of said system but, for low-speed operation, I connect the frequency changer between the source and one winding of the motor operating as a primary member, connecting the remaining winding in a closed circuit; and, for speeds between 50% and 150% of synchronous speed, I connect the previously closed circuited winding directly to the source for primary operation and retain the connection of the remaining winding to the source through the frequency changer for secondary operation. By this means, I am enabled to obtain speed regulation of the induction motor from zero to 150% synchronous speed with a frequency changer of one-half the capacity of the motor and with a maximum operating frequency of one-half that of the line.

Referring to the drawing for a more detailed understanding of my invention, I show an induction motor at 1 provided with stator terminals 2 and with rotor terminals 3—3 of the slip-ring type. The stator terminals 2—2 may be connected directly to a supply system 4—4 by a switch 5 when moved to the right or the terminals 2—2 may be closed-circuited upon each other by the switch 5, when moved to the left. The rotor terminals 3—3 are connected to the commutator end of a frequency changer 6 the slip ring end of which is connected to the mains 4—4 through an adjustable transformer 7. A reversing switch 8 is placed between the motor 1 and the frequency changer 6 in order that two of the leads therebetween may be interchanged and the phase sequence of the voltage applied to the rotor member reversed.

The provision of the reversing switch 8 is necessary because, when the motor is operating from the frequency changer with the stator terminals short-circuited, the rotor field is rotating backwardly relatively to the rotor, but when the stator windings are energized as the primary windings to cause the rotor to turn in the same direction as before, the slip-frequency currents in the rotor produce a field which rotates forwardly relatively to the rotor. The reversing switch just described is the sole distinguishing feature which was added, in the present disclosure, to the combination and arrangement shown in my prior application, Serial No. 69,189, hereinabove referred to, in order to make possible the operation described.

The frequency changer 6 has, preferably, substantially one-half the capacity of the motor 1 and may be provided with a stator winding 9, the current in which is adjusted by a suitable closed-circuiting rheostat 10 for power-factor control, as disclosed in a copending application of F. W. Meyer, Serial No. 741,458, filed Jan. 11, 1913, and assigned to the Westinghouse Electric & Manufacturing Company.

Referring now to Fig. 2, a system is shown wherein the stator and rotor windings of the motor above described are functionally interchanged. The frequency changer 6 is connected between the stator winding and the source of supply while the rotor member of the main motor is adapted, either for connection directly with the source, or for closed-circuiting as heretofore described.

Having thus described the arrangement of a system involving my invention, the operation is as follows. At the outset, the switch 5 is thrown to the left, closed-circuiting the stator winding of the motor 1, and the transformer 7 is adjusted to supply a low voltage to the rotor winding of the motor 1 through the frequency changer 6. The motor 1 thereupon starts with its rotor winding operating as a primary member and with its stator winding operating as a secondary member. The speed is then gradually raised by adjusting the transformer 7 until substantially 50% of sychronous speed is attained. The frequency changer 6 is then operating at full capacity to supply to the motor 1 substantially one-half its rated energy. The frequency at the commutator of the machine 6 is substantially one-half line frequency and, therefore, but little commutation difficulty is encountered. The switch 5 is then thrown to the right, and the switch 8 is simultaneously reversed, whereupon the stator of the motor 1 operates as a primary member and a relatively high voltage is maintained across the rotor winding which is now operating as a secondary winding, resulting in such a slip as to cause but a small increment in the speed. The voltage maintained across the terminals of the rotor winding is now gradualy reduced by adjustment of the transformer 7, and the energy given off by the rotor of the motor 1 is returned to the line.

If, while operating as shown, the rheostat 10 be adjusted without altering the transformer 7, the speed of the machine 6, and, consequently, the output frequency thereof, remains unchanged because of the synchronizing action between the two machines, but wattless currents are produced which, by proper control, may be made to correct the power-factor of the motor 1 to any desired extent.

For operation above synchronous speed, the phase sequence of the applied voltage is changed by manipulation of the switch 8 while the transformer 7 and the speed of the machine 6 are adjusted to supply energy to the secondary member of the machine 1 in the usual manner.

My copending application, Serial No. 266,747, filed December 14, 1918, covers certain of the broader features of the herein-described invention, including the application thereof to any mechanism of the induction-motor type, which may include a plurality of induction motors operating as a single unit.

While I have shown a frequency changer of the self-propelling type, I may, if desired, employ a separately driven machine, either with or without a stator field winding, as is well known in the art.

My invention is capable of various other modifications, short-circuiting the stator winding through a variable resistance when employed as a secondary winding, which may be made without departing from the spirit thereof and I desire, therefore, that only such limitations shall be imposed thereupon as are indicated in the appended claims.

I claim as my invention:

1. The combination with an induction motor, having two members which are relatively rotatable one with respect to the other, of a source of alternating current of relatively high frequency, an adjustable source of alternating current of relatively low frequency, and means for, at times, connecting one member of said motor to said high-frequency source and the other member of said motor to said low-frequency source and at other times connecting said low-frequency source to one member of said motor and closing the other member thereof upon itself.

2. The combination with an induction motor embodying rotor and stator windings, of two sources of alternating current of relatively high constant frequency and relatively low variable frequency, respectively, and means for, at times, connecting one of said windings to said high-frequency source for primary operation and the other of said windings to said low-frequency source for secondary operation and for, at other times, connecting one winding to said low-frequency source for primary operation and closed-circuiting the other winding for secondary operation.

3. The combination with an induction motor embodying rotor and stator windings, of a source of alternating current of relatively high constant frequency, a source of relatively low variable frequency, respectively, and means for, at times, connecting said stator winding to said high-frequency source for primary operation and said rotor winding to said low-frequency source for secondary operation and for at other times, connecting said rotor winding to said low-frequency source for primary operation and closed-circuiting said stator winding for secondary operation, 4. The combination with an induction motor having two members which are relatively rotatable one with respect to the other and a winding on each of said members, of a source of alternating current of relatively high constant frequency, a source of relatively low variable frequency, means for either close-circuiting one of said windings or connecting the same to said high-frequency source, and means for connecting the other of said windings to said low-frequency source and for reversing the phase-rotation of the electromotive forces of said low-frequency source.

5. The combination with an induction motor having two members which are relatively rotatable one with respect to the other and a winding on each of said members, of a source of alternating current of relatively high constant frequency, a source of relatively low variable frequency, means for either close-circuiting one of said windings or connecting the same to said high-frequency source, means for connecting the other of said windings to said low-frequency source and for reversing the phase-rotation of the electromotive forces of said low-frequency source, and variable transformer means for controlling the magnitudes of said electromotive forces.

6. The combination with an induction motor having two members which are relatively rotatable one with respect to the other and a winding on each of said members, of a source of alternating current of relatively high constant frequency, a variable-frequency frequency changer associated with said source for producing relatively low frequencies, means for either close-circuiting one of said windings or connecting the same to said high-frequency source, and means for connecting the other of said windings to said frequency changer and for reversing the phase-rotation of the electromotive forces of said frequency changer.

7. The combination with an induction motor having two members which are relatively rotatable one with respect to the other and a winding on each of said members, of a source of alternating current of relatively high constant frequency, a variable-frequency frequency changer associated with said source for producing relatively low frequencies, means for either close-circuiting one of said windings or connecting the same to said high-frequency source, means for connecting the other of said windings to said frequency changer and for reversing the phase-rotation of the electromotive forces of said frequency changer, and variable transformer means for controlling the magnitudes of said electromotive forces.

8. The method of securing an economical utilization of an adjustable-ratio frequency changer in connection with a source of alternating current to accelerate an induction motor which comprises first supplying one member of said motor with current of reduced frequency through said frequency-changer and closing the remaining member upon itself, and subsequently connecting said last mentioned member directly to said source, while reversing the phase sequence of the currents in the other members.

9. The method of securing an economical utilization of an adjustable-ratio frequency changer in connection with a source of alternating current to accelerate an induction motor which comprises first employing one winding of said motor as a primary member, supplying the same with current of reduced frequency through said frequency changer, and closing the remaining winding upon itself for operation as a secondary member, and subsequently connecting said last mentioned winding to said source for operation as a primary member and causing said first-mentioned winding to operate as a secondary member, interchanging energy with said source through said frequency changer.

10. The method of securing an economical utilization of an adjustable-ratio frequency changer in connection with a source of alternating current to control the speed of an induction motor which comprises, at times, supplying one member of said motor with current of reduced frequency through said frequency changer and close-circuiting the other member and, at other times, connecting one member directly to said source and the other member to said frequency changer.

11. The method of securing an economical utilization of an adjustable-ratio frequency changer in connection with a source of alternating current to control the speed of an induction motor which comprises, at times, supplying one member of said motor with current of reduced frequency through said frequency changer and close-circuiting the other member, and, at other times, connecting said last named member directly to said source and the other member to said frequency changer.

12. The method of securing an economical utilization of an adjustable-ratio frequency changer associated with a source of alternating current to accelerate an induction motor, which comprises supplying one member of said motor with current of low frequency through said frequency changer and close-circuiting the other member of said motor, gradually increasing the frequency of the current supplied to said first-named member to substantially half of the frequency of said source, then connecting said second-named member directly to said source, reversing the connections of said frequency changer and gradually decreasing the frequency of said frequency changer.

13. The method of operating an induction motor associated with a main source of alternating current and with an auxiliary source of relatively low variable frequencies which comprises first supplying one member of the motor with current from said auxiliary source and close-circuiting the other motor member, gradually increasing the frequency of the current supplied from said auxiliary source up to substantially half the frequency of said main source, then connecting one of the motor members directly to said main source and the other member to said auxiliary source and gradually decreasing the frequency of said auxiliary source.

14. The method of controlling the speed of an induction motor associated with a source of alternating current which comprises at times, supplying one member of said motor with current of reduced frequency and close-circuiting the other member and, at other times, connecting one member directly to said source and supplying a current of variable frequency to the other member.

15. The method of operating a variable-speed induction machine associated with a source of relatively high frequency and a variable-frequency source of relatively low frequency which comprises, at times, connecting one member of said machine to said low-frequency source and close-circuiting the other member and, at other times, connecting said second-mentioned member to said high-frequency source and reversing the phase-sequence of the connections of said first-mentioned member.

In testimony whereof, I have hereunto subscribed my name this 24th day of Aug. 1918.

RUDOLF E. HELLMUND.